United States Patent
Yan et al.

(10) Patent No.: US 9,919,578 B2
(45) Date of Patent: Mar. 20, 2018

(54) ELECTRIC VEHICLE AND POWERTRAIN SYSTEM THEREOF

(71) Applicant: OPTIMUM BATTERY CO., LTD., Shenzhen, Guangdong (CN)

(72) Inventors: Weiyang Yan, Guangdong (CN); Shizhao Ju, Guangdong (CN)

(73) Assignee: OPTIMUM BATTERY CO., LTD., Shenzhen (CN)

( * ) Notice: Subject to any disclaimer, the term of this patent is extended or adjusted under 35 U.S.C. 154(b) by 0 days.

(21) Appl. No.: 15/481,489

(22) Filed: Apr. 7, 2017

(65) Prior Publication Data
US 2017/0297410 A1 Oct. 19, 2017

(30) Foreign Application Priority Data
Apr. 18, 2016 (CN) .......................... 2016 1 0238927

(51) Int. Cl.
| | |
|---|---|
| B60H 1/00 | (2006.01) |
| B60H 1/32 | (2006.01) |
| B60L 11/18 | (2006.01) |
| B62D 5/06 | (2006.01) |
| F01P 5/04 | (2006.01) |
| F01P 5/10 | (2006.01) |
| F16H 7/02 | (2006.01) |
| B60L 1/00 | (2006.01) |
| B60L 1/02 | (2006.01) |
| B60K 1/00 | (2006.01) |
| B60K 25/00 | (2006.01) |

(52) U.S. Cl.
CPC ..... B60H 1/00428 (2013.01); B60H 1/00392 (2013.01); B60H 1/3222 (2013.01); B60L 1/003 (2013.01); B60L 1/006 (2013.01); B60L 1/02 (2013.01); B60L 11/1864 (2013.01); B62D 5/063 (2013.01); F01P 5/04 (2013.01); F01P 5/10 (2013.01); F16H 7/02 (2013.01); B60H 2001/3292 (2013.01); B60K 2001/006 (2013.01); B60K 2025/005 (2013.01); B60Y 2200/91 (2013.01); F01P 2005/046 (2013.01)

(58) Field of Classification Search
CPC .. B60R 16/03; B60H 1/00392; B60H 1/0042; B60H 1/3222; B60H 2001/3292; B60K 17/10; B60K 17/356; B60K 2001/006; B60K 2025/005; B60K 6/12
See application file for complete search history.

(56) References Cited

U.S. PATENT DOCUMENTS

| | | | | |
|---|---|---|---|---|
| 8,216,113 B2 * | 7/2012 | Parsons | ............ | F02N 11/04 180/53.8 |
| 9,464,697 B2 * | 10/2016 | Antchak | ............ | F02B 67/06 |
| 2005/0223706 A1 * | 10/2005 | Mitchell | ............ | B60K 6/12 60/606 |
| 2009/0298646 A1 * | 12/2009 | Parsons | ............ | F02N 11/04 477/167 |

* cited by examiner

*Primary Examiner* — John D Walters
*Assistant Examiner* — James J Triggs (57) ABSTRACT

A powertrain system includes an electric generator, a compressor, a water cooling module including a water pump, an electronic fan, a steering pump, a pneumatic module including an air pump, a transmission device, and an electric motor. The electric motor is configured to drive the electric generator, the compressor, the water pump, the electronic fan, the steering pump, and the air pump to work through the transmission device. The present invention further provides an electric vehicle with the powertrain system.

20 Claims, 6 Drawing Sheets

ELECTRIC VEHICLE AND POWERTRAIN SYSTEM THEREOF

CROSS-REFERENCE TO RELATED APPLICATIONS

The present application claims the benefit of Chinese Patent Application No. 201610238927.8 filed on Apr. 18, 2016, the contents of which are hereby incorporated by reference.

BACKGROUND OF THE INVENTION

Field of the Invention

This invention relates to electric vehicles, and more particular, to an electric vehicle having a powertrain system.

Description of the Related Art

In order to alleviate the situation of shortage of oil resource and reduce the pollution of automobile fuel to the environment, the development of new energy vehicles is faster and faster. In recent years, electric vehicles are used more popular. An existing electric vehicle uses a drive motor powered by batteries to replace with a gasoline engine of a fuel vehicle. However, in the existing electric vehicle, a structure of an electric auxiliary system is complex, high-voltage accessories have large safety hazards, layout is decentralized, and the system has large volume and low reliability. Furthermore, the design of the existing electric vehicle requires a large change in location and space of the original engine compartment of the fuel vehicle, which results in an increase in manufacturing costs.

It is desirable to provide an invention, which can overcome the problems and limitations mentioned above.

SUMMARY OF THE INVENTION

The present invention is directed to an electric vehicle and a powertrain system of the electric vehicle that substantially obviates one or more of the problems due to limitations and disadvantages of the related art.

In an aspect of the present invention, there is provided a powertrain system comprising: an electric generator configured to convert mechanical energy to electrical energy; a compressor configured to compress and drive a refrigerant of an air conditioning; a water cooling module configured to dissipate heat of the powertrain system, wherein the water cooling module comprises a water pump; an electronic fan configured to dissipate heat of the powertrain system; a steering pump configured to implement an electric vehicle steer by augmenting steering effort of a steering wheel; a pneumatic module configured to be powered by compressed air, wherein the pneumatic module comprises an air pump; a transmission device; and an electric motor configured to drive the electric generator, the compressor, the water pump, the electronic fan, the steering pump, and the air pump to work through the transmission device.

In another aspect of the present invention, there is provided an electric vehicle comprising a powertrain system and an energy storage system. The powertrain system comprises an electric generator configured to convert mechanical energy to electrical energy; a compressor configured to compress and drive a refrigerant of an air conditioning; a water cooling module configured to dissipate heat of the powertrain system, wherein the water cooling module comprises a water pump; an electronic fan configured to dissipate heat of the powertrain system; a steering pump configured to implement the electric vehicle steer by augmenting steering effort of a steering wheel; a pneumatic module configured to be powered by compressed air, wherein the pneumatic module comprises an air pump; a transmission device; and an electric motor configured to drive the electric generator, the compressor, the water pump, the electronic fan, the steering pump, and the air pump to work through the transmission device. The energy storage system comprises a battery pack configured to supply electrical energy to the electric motor; and a battery management system configured to manage the battery pack.

It is to be understood that both the foregoing general description and the following detailed description are exemplary and explanatory and are intended to provide further explanations of the invention as claimed.

BRIEF DESCRIPTION OF THE DRAWINGS

Implementations of the present technology will now be described, by way of example only, with reference to the attached drawings. It may be understood that these drawings are not necessarily drawn to scale, and in no way limit any changes in form and detail that may be made to the described embodiments by one skilled in the art without departing from the spirit and scope of the described embodiments.

DETAILED DESCRIPTION OF THE PREFERRED EMBODIMENTS

In order to make the purposes, technical solutions, and advantages of the present invention be clearer, the present invention will be further described in detail hereafter with reference to the accompanying drawings and embodiments. However, it will be understood by those of ordinary skill in the art that the embodiments described herein can be practiced without these specific details. In other instances, methods, procedures and components have not been described in detail so as not to obscure the related relevant feature being described. Also, it should be understood that the embodiments described herein are only intended to illustrate but not to limit the present invention.

Several definitions that apply throughout this disclosure will be presented. The term "coupled" is defined as connected, whether directly or indirectly through intervening components, and is not necessarily limited to physical connections. The connection can be such that the objects are permanently connected or releasably connected. The term "comprise", when utilized, means "include, but not necessarily limited to"; it specifically indicates open-ended inclusion or membership in a so-described combination, group, series and the like.

It should be noted that references to "an" or "one" embodiment in this disclosure are not necessarily to the same embodiment, and such references mean "at least one."

Figure 1:
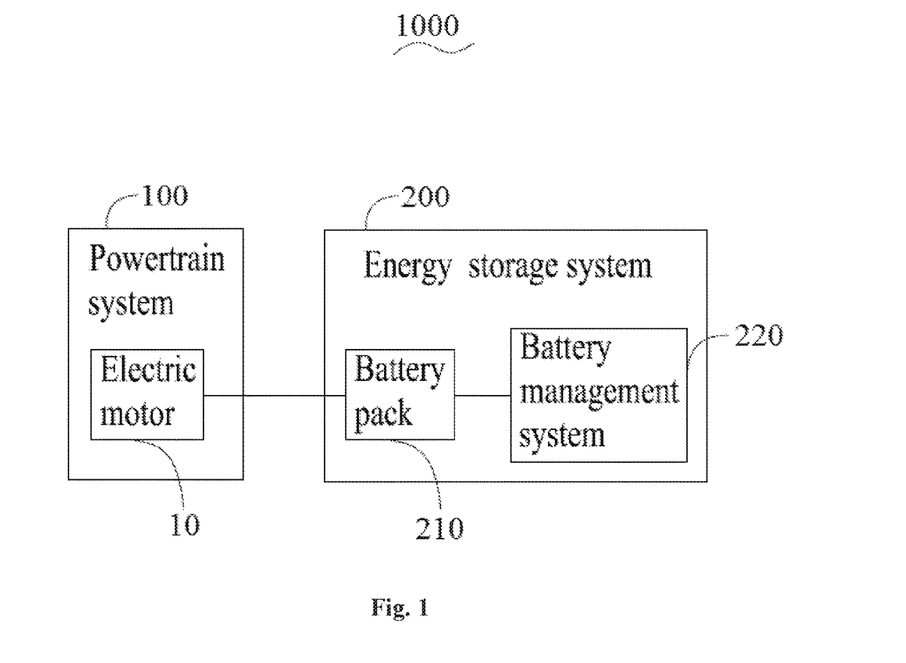
FIG. 1 is a block schematic diagram of an electric vehicle provided by one embodiment of the present invention, wherein the electric vehicle comprises a powertrain system.

FIG. 1 illustrates a block schematic diagram of an electric vehicle 1000 provided by one embodiment of the present invention. The electric vehicle 1000 comprises a powertrain system 100 and an energy storage system 200. The powertrain system 100 is coupled to the energy storage system 200, and is supplied electrical energy by the energy storage system 200.

The powertrain system 100 comprises an electric motor 10. The energy storage system 200 comprises a battery pack 210 and a battery management system 220. The battery pack 210 is coupled to the electric motor 10 and the battery management system 220. The battery pack 210 is configured to supply electrical energy to the electric motor 10. The battery management system 220 is configured to manage the battery pack 210. The battery pack 210 comprises a plurality of individual battery cells. The individual battery cells may be configured in a series, parallel or a mixture of both to deliver the desired voltage, capacity, or power density to the electric motor 10. The battery management system 220 manages each individual battery cell of the battery pack 210, such as monitoring its parameters of voltage, temperature, state of charge, and so on.

Referring to FIG. 2 to FIG. 6, the powertrain system 100 further comprises an electric generator 11, an air conditioning 20, a water cooling module 30, an electronic fan 40, a steering pump 50, a pneumatic module 60, a transmission device 80, a vehicle controller 90, a first sensor 91, a second sensor 92, and a third sensor 93. The air conditioning 20 comprises a compressor 26. The water cooling module 30 comprises a water pump 36. The pneumatic module 60 comprises an air tank 62 and an air pump 66. The transmission device 80 comprises a first relay 81, a second relay 82, a third relay 83, a first clutch 84, a second clutch 85, a third clutch 86, and belts 88 and gears 89.

The electric motor 10 is coupled to the electric generator 11, the compressor 26, the water pump 36, the electronic fan 40, the steering pump 50, and the air pump 66 through the transmission device 80. The vehicle controller 90 is coupled to the first relay 81, the second relay 82, the third relay 83, the first sensor 91, the second sensor 92, and the third sensor 93. The first clutch 84 is coupled to the air pump 66 and the first relay 81. The second clutch 85 is coupled to the compressor 26 and the second relay 82. The third clutch 86 is coupled to the electronic fan 40 and the third relay 83. In one embodiment, each of the first clutch 84, the second clutch 85, and the third clutch 86 is an electromagnetic clutch.

The electric motor 10 is configured to drive the electric generator 11, the compressor 26, the water pump 36, the electronic fan 40, the steering pump 50, and the air pump 66 to work through the transmission device 80. The electric generator 11 is configured to convert mechanical energy to electrical energy. The compressor 26 is configured to compress and drive a refrigerant of the air conditioning 20. The water cooling module 30 is configured to dissipate heat of the powertrain system 100. The electronic fan 40 is configured to dissipate heat of the powertrain system 100. The steering pump 50 is configured to implement the electric vehicle 1000 steer by augmenting steering effort of a steering wheel. The pneumatic module 60 is configured to be powered by compressed air.

Figure 2:
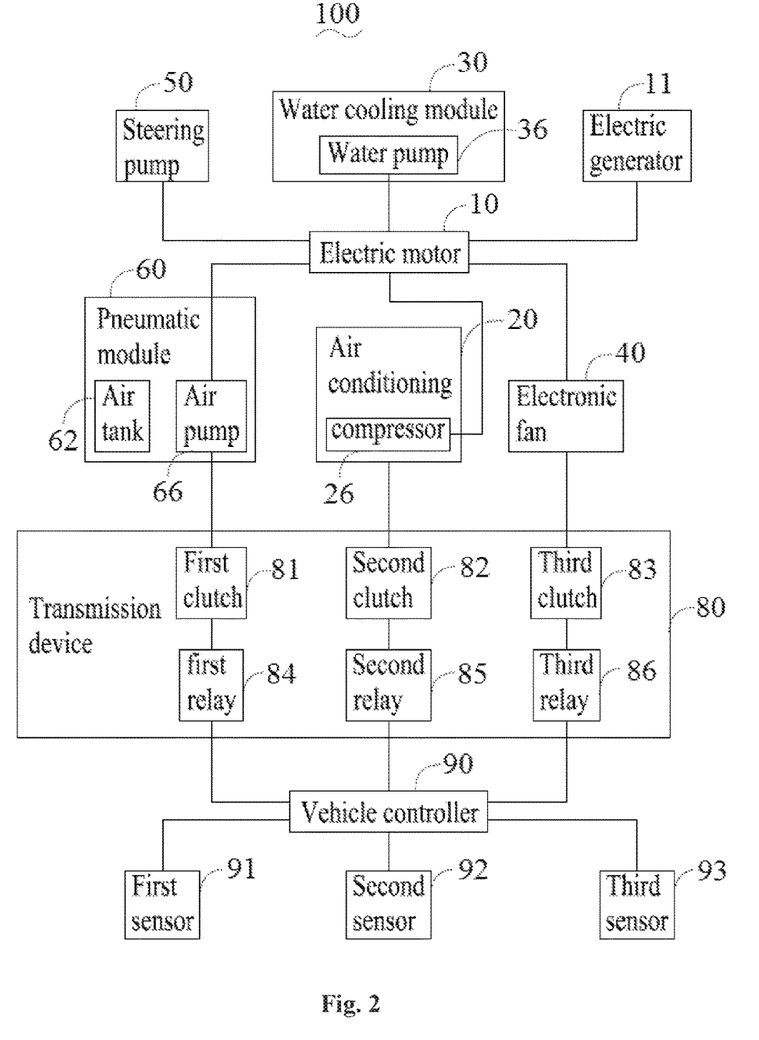
FIG. 2 is a block schematic diagram of the powertrain system of FIG. 1.
Figure 3:
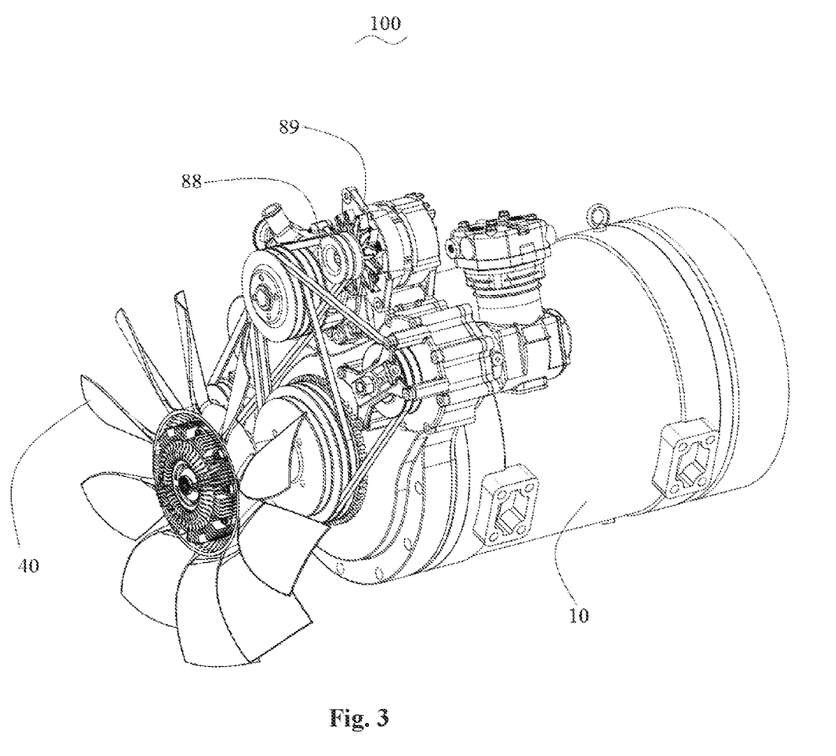
FIG. 3 is an isometric, schematic view of the powertrain system of FIG. 1.
Figure 4:
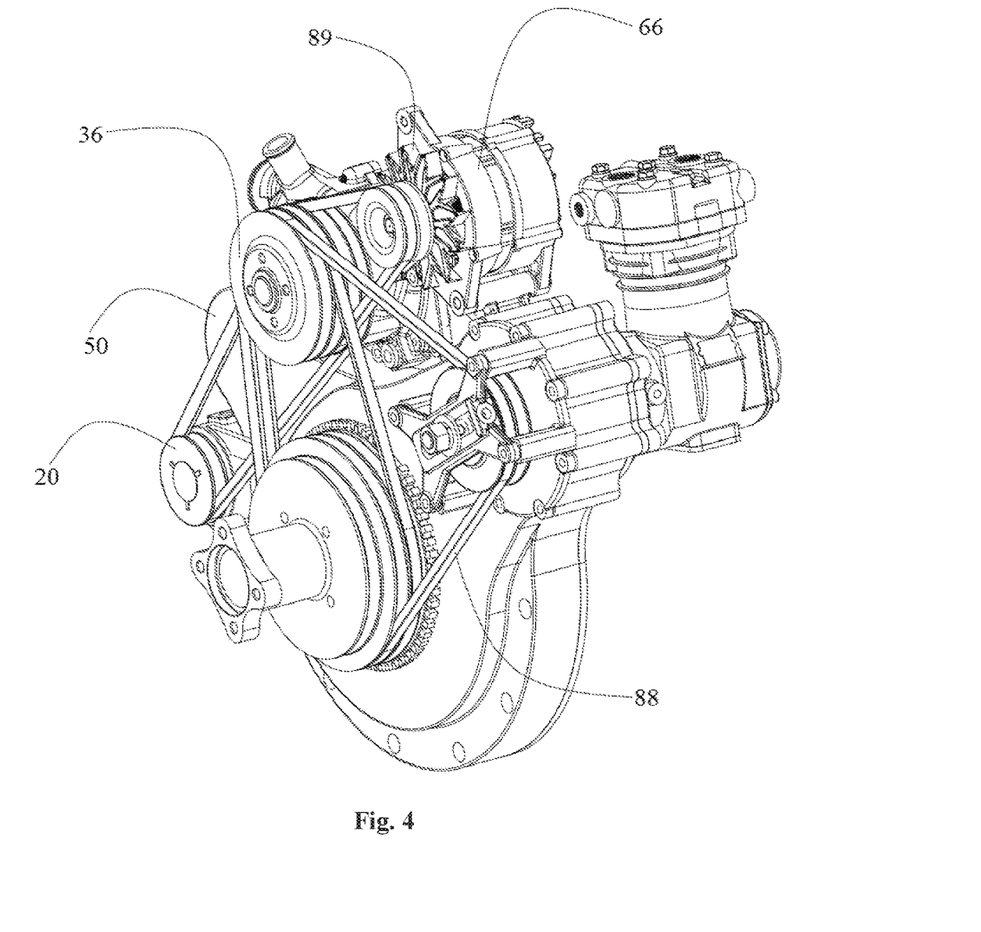
FIG. 4 is an isometric, schematic view of a part of the powertrain system of FIG. 3.
Figure 5:
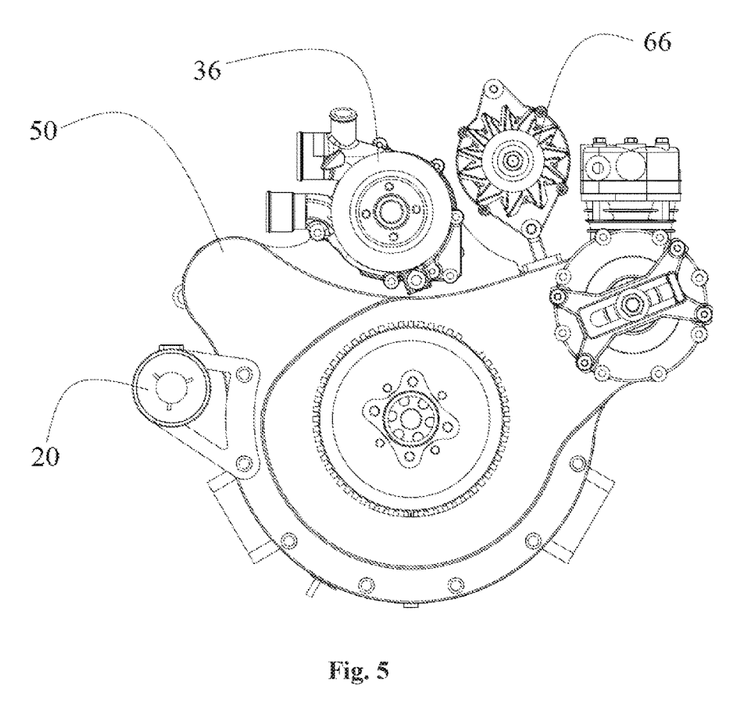
FIG. 5 is a front view of FIG. 4.
Figure 6:
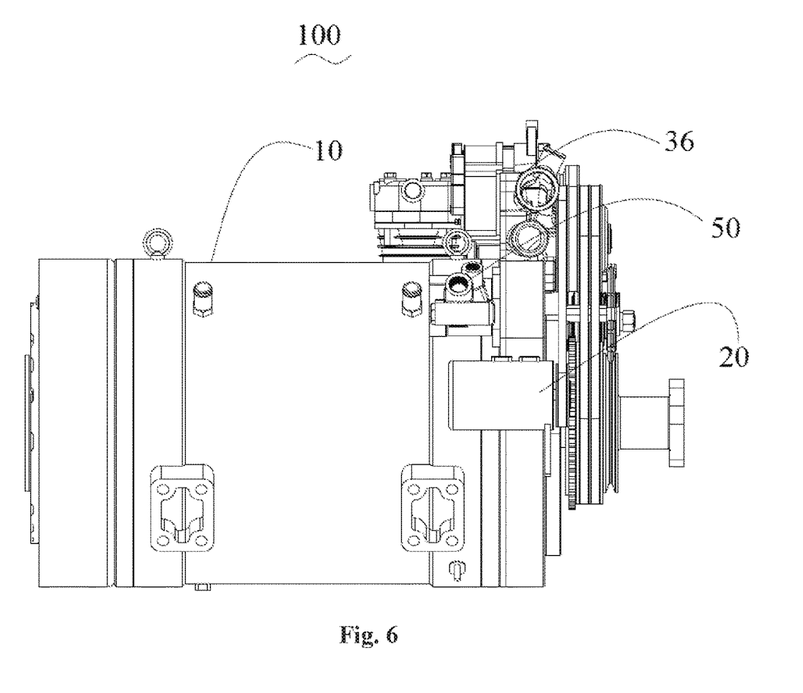
FIG. 6 is an isometric, side view of a part of the powertrain system of FIG. 3.

The first sensor 91 is configured to sense air pressure of the air tank 62, and output sensed air pressure to the vehicle controller 90. The second sensor 92 is configured to sense a turned on state or a turned off state of the air conditioning 20, and output sensed turned state on or turned off state of the air conditioning 20 to the vehicle controller 90. The third sensor 93 is configured to sense water temperature of the water cooling module 30, and output sensed water temperature to the vehicle controller 90. The vehicle controller 90 is configured to control the first relay 81 to be turned on or turned off, according to the sensed air pressure received from the first sensor 91. The vehicle controller 90 is further configured to control the second relay 82 to be turned on or turned off, according to the sensed turned on state or turned off state of the air conditioning 20 received from the second sensor 92. The vehicle controller 90 is further configured to control the third relay 83 to be turned on or turned off, according to the sensed water temperature received from the third sensor 93.

The first clutch 84 is configured to engage or disengage power from the electric motor 10 to the air pump 66, according to a turned on state or a turned off state of the first relay 81. The second clutch 85 is configured to engage or disengage power from the electric motor 10 to the compressor 26, according to a turned on state or a turned off state of the second relay 82. The third clutch 86 is configured to engage or disengage power from the electric motor 10 to the electronic fan 40, according to a turned on state or a turned off state of the third relay 83.

In one embodiment, a rotation axis of the electronic fan 40 is located on the same line as a main shaft of the electric motor 10. The air pump 66, the compressor 26, the water pump 36, and the steering pump 50 are positioned on the same side of the electric motor 10. The electric generator 11 supplies a 12 volts (V) voltage. In other embodiments, the electric generator 11 supplies other voltages, such as a 5V voltage, a 24V voltage.

In use, the electric vehicle 1000 is started to work by a vehicle key, and start modes of the electric vehicle 1000 comprises a normal start mode and an energy-saving start mode. In the normal start mode, the electric motor 10 starts at a default idle rotational speed. In the energy-saving start mode, the electric motor 10 starts at a zero rotational speed.

When the electric motor 10 is started, the main shaft of the electric motor 10 rotates and drives the steering pump 50, the water pump 36, and the electric generator 11 to work through the belts 88 and the gears 89 of the transmission device 80. The first clutch 84 determines whether the air pump 66 is driven to work by the electric motor 10. The second clutch 85 determines whether the compressor 26 is driven to work by the electric motor 10. The third clutch 86 determines whether the electronic fan 40 is driven to work by the electric motor 10.

When the vehicle controller 90 determines that the sensed air pressure received from the first sensor 91 is less than a first reference value, the vehicle controller 90 controls the first relay 81 to be turned on, the first clutch 84 engages power from the electric motor 10 to the air pump 66, and the air pump 66 is driven to work by the electric motor 10 through the transmission device 80. The air pump 66 inflates the air tank 62, and the air pressure of the air tank 62 increases. When the vehicle controller 90 determines that the sensed air pressure received from the first sensor 91 is greater than a second reference value, the vehicle controller 90 controls the first relay 81 to be turned off, the first clutch 84 disengages power from the electric motor 10 to the air pump 66, and the air pump 66 stop working. It may be understood that, the second reference value is greater than the first reference value.

In order to enjoy driving pleasure in a comfortable environment, a driver may use the air conditioning 20 to adjust the temperature inside the electric vehicle 1000. When the air conditioning 20 is turned on by the driver, the second sensor 92 senses that the air conditioning 20 is in a turned on state, and outputs the turned on state of the air conditioning 20 to the vehicle controller 90. The vehicle controller 90 controls the second relay 82 to be turned on, according to the turned on state of the air conditioning 20 received from the second sensor 92. The second clutch 85 engages power from the electric motor 10 to the compressor 26, and the compressor 26 is driven to work by the electric motor 10 through the transmission device 80. The compressor 26 compresses and drives the refrigerant of the air conditioning 20, to achieve heating or cooling function, thereby the temperature inside the electric vehicle 1000 is adjusted. When the second sensor 92 senses that the air conditioning 20 is in the turned off state, and outputs the turned off state of the air conditioning 20 to the vehicle controller 90, the vehicle controller 90 controls the second relay 82 to be turned off, the second clutch 85 disengages power from the electric motor 10 to the compressor 26, and the compressor 26 stop working.

When the electric vehicle 1000 is in a high-speed and/or long distance driving, the powertrain system 100 will generate a lot of heat. The powertrain system 100 should be in an appropriate temperature range to ensure its stable operation, and redundant heat must be dissipated timely. However, the water cooling module 30 dissipates heat slowly, therefore, the electronic fan 40 is adapted to assist the water cooling module 30 to dissipate heat timely.

When the vehicle controller 90 determines that the sensed water temperature received from the third sensor 93 is greater than a third reference value, the vehicle controller 90 controls the third relay 83 to be turned on, thereby the third clutch 86 engages power from the electric motor 10 to the electronic fan 40, and the electronic fan 40 is driven to work by the electric motor 10 through the transmission device 80. When the vehicle controller 90 determines that the sensed water temperature received from the third sensor 93 is less than or equal to the third reference value, the vehicle controller 90 controls the third relay 83 to be turned off, thereby the third clutch 86 disengages power from the electric motor 10 to the electronic fan 40, and the electronic fan 40 stop working.

In present invention, the electric motor 10 functions as a power source to drive the electric generator 11, the compressor 26, the water pump 36, the electronic fan 40, the steering pump 50, and the air pump 66 to work, so that a structure of the powertrain system 100 is simple and compact, layout is centralized, and functions of an fuel vehicle can be achieved without change the fuel vehicle models and accessories, to adapt to driving habits of the majority of vehicle users. Furthermore, there is no need to re-develop DC/DC converters, electric water pump and electric compressor and other accessories, therefore high-voltage electrical safety issues generated by high-voltage power accessories is avoided, the development cycle is shorten, and the manufacturing cost is saved.

In present invention, the first sensor 91 is configured to sense air pressure of the air tank 62, the second sensor 92 is configured to sense a turned on state or a turned off state of the air conditioning 20, the third sensor 93 is configured to sense water temperature of the water cooling module 30, the vehicle controller 90 is configured to control the first relay 81, the second relay 82, and the third relay 83 be to be turned on or turned off, according to the sensed results received from the first sensor 91, the second sensor 92, and the third sensor 93, thereby to control the first clutch 84, the second clutch 85, and the third clutch 86 to work or not, so that the powertrain system 100 can be operated more stable, and energy is saved.

In present invention, the electric generator 11, the compressor 26, the water pump 36, the electronic fan 40, the steering pump 50, and the air pump 66 are driven by the electric motor 10, which is contribute to the late troubleshooting, and improves the efficiency of machine maintenance.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A powertrain system (100), comprising:
   an electric generator (11) configured to convert mechanical energy to electrical energy;
   a compressor (26) configured to compress and drive a refrigerant of an air conditioning (20);
   a water cooling module (30) configured to dissipate heat of the powertrain system (100), wherein the water cooling module (30) comprises a water pump (36);
   an electronic fan (40) configured to dissipate heat of the powertrain system (100);
   a steering pump (50) configured to implement an electric vehicle (1000) steer by augmenting steering effort of a steering wheel;
   a pneumatic module (60) configured to be powered by compressed air, wherein the pneumatic module (60) comprises an air pump (66);
   a transmission device (80); and
   an electric motor (10) configured to drive the electric generator (11), the compressor (26), the water pump (36), the electronic fan (40), the steering pump (50), and the air pump (66) to work through the transmission device (80).

2. The powertrain system (100) of claim 1, wherein the pneumatic module (60) further comprises an air tank (62), the transmission device (80) comprises a first relay (81) and a first clutch (84), and the powertrain system (100) further comprises:
   a first sensor (91) configured to sense air pressure of the air tank (62), and output sensed air pressure; and
   a vehicle controller (90) configured to control the first relay (81) to be turned on or turned off, according to the sensed air pressure received from the first sensor (91); and
   wherein the first clutch (84) is coupled to the air pump (66), and is coupled to the vehicle controller (90) through the first relay (81), the first clutch (84) is configured to engage or disengage power from the electric motor (10) to the air pump (66), according to a turned on state or a turned off state of the first relay (81).

3. The powertrain system (100) of claim 2, wherein when the vehicle controller (90) determines that the sensed air pressure received from the first sensor (91) is less than a first reference value, the vehicle controller (90) controls the first relay (81) to be turned on, the first clutch (84) engages power from the electric motor (10) to the air pump (66), the air pump (66) is driven to work by the electric motor (10) through the transmission device (80), the air pump (66)

inflates the air tank (62), and the air pressure of the air tank (62) is increased; when the vehicle controller (90) determines that the sensed air pressure received from the first sensor (91) is greater than a second reference value, the vehicle controller (90) controls the first relay (81) to be turned off, the first clutch (84) disengages power from the electric motor (10) to the air pump (66), and the air pump (66) stop working; and wherein the second reference value is greater than the first reference value.

4. The powertrain system (100) of claim 1, wherein the transmission device (80) comprises a second relay (82) and a second clutch (85), and the powertrain system (100) further comprises:
   a second sensor (92) configured to sense a turned on state or a turned off state of the air conditioning (20), and output sensed turned on state or turned off state of the air conditioning (20); and
   a vehicle controller (90) configured to control the second relay (82) to be turned on or turned off, according to the sensed turned on state or turned off state of the air conditioning (20) received from the second sensor (92); and
   wherein the second clutch (85) is coupled to the compressor (26), and is coupled to the vehicle controller (90) through the second relay (82), the second clutch (85) is configured to engage or disengage power from the electric motor (10) to the compressor (26), according to a turned on state or a turned off state of the second relay (82).

5. The powertrain system (100) of claim 4, wherein when the second sensor (92) senses that the air conditioning (20) is in the turned on state, and outputs the turned on state of the air conditioning (20) to the vehicle controller (90), the vehicle controller (90) controls the second relay (82) to be turned on, the second clutch (85) engages power from the electric motor (10) to the compressor (26), and the compressor (26) is driven to work by the electric motor (10) through the transmission device (80); when the second sensor (92) senses that the air conditioning (20) is in the turned off state, and outputs the turned off state of the air conditioning (20) to the vehicle controller (90), the vehicle controller (90) controls the second relay (82) to be turned off, the second clutch (85) disengages power from the electric motor (10) to the compressor (26), and the compressor (26) stop working.

6. The powertrain system (100) of claim 1, wherein the transmission device (80) comprises a third relay (83) and a third clutch (86), and the powertrain system (100) further comprises:
   a third sensor (93) configured to sense water temperature of the water cooling module (30), and output sensed water temperature; and
   a vehicle controller (90) configured to control the third relay (83) to be turned on or turned off, according to the sensed water temperature received from the third sensor (93); and
   wherein the third clutch (86) is coupled to the electronic fan (40), and is coupled to the vehicle controller (90) through the third relay (83), the third clutch (86) is configured to engage or disengage power from the electric motor (10) to the electronic fan (40), according to a turned on state or a turned off state of the second relay (82).

7. The powertrain system (100) of claim 6, wherein when the vehicle controller (90) determines that the sensed water temperature received from the third sensor (93) is greater than a third reference value, the vehicle controller (90) controls the third relay (83) to be turned on, the third clutch (86) engages power from the electric motor (10) to the electronic fan (40), and the electronic fan (40) is driven to work by the electric motor (10) through the transmission device (80); when the vehicle controller (90) determines that the sensed water temperature received from the third sensor (93) is less than or equal to the third reference value, the vehicle controller (90) controls the third relay (83) to be turned off, the third clutch (86) disengages power from the electric motor (10) to the electronic fan (40), and the electronic fan (40) stop working.

8. The powertrain system (100) of claim 1, wherein a rotation axis of the electronic fan (40) is located on the same line as a main shaft of the electric motor (10).

9. The powertrain system (100) of claim 1, wherein the air pump (66), the compressor (26), the water pump (36), and the steering pump (50) are positioned on the same side of the electric motor (10).

10. The powertrain system (100) of claim 1, wherein the transmission device (80) comprises belts (88) and gears (89).

11. An electric vehicle (1000), comprising:
    a powertrain system (100) comprising:
       an electric generator (11) configured to convert mechanical energy to electrical energy;
       a compressor (26) configured to compress and drive a refrigerant of an air conditioning (20);
       a water cooling module (30) configured to dissipate heat of the powertrain system (100), wherein the water cooling module (30) comprises a water pump (36);
       an electronic fan (40) configured to dissipate heat of the powertrain system (100);
       a steering pump (50) configured to implement the electric vehicle (1000) steer by augmenting steering effort of a steering wheel;
       a pneumatic module (60) configured to be powered by compressed air, wherein the pneumatic module (60) comprises an air pump (66);
       a transmission device (80); and
       an electric motor (10) configured to drive the electric generator (11), the compressor (26), the water pump (36), the electronic fan (40), the steering pump (50), and the air pump (66) to work through the transmission device (80); and
    an energy storage system (200) comprising:
       a battery pack (210) configured to supply electrical energy to the electric motor (10); and
       a battery management system (220) configured to manage the battery pack (210).

12. The electric vehicle (1000) of claim 11, wherein the pneumatic module (60) further comprises an air tank (62), the transmission device (80) comprises a first relay (81) and a first clutch (84), and the powertrain system (100) further comprises:
    a first sensor (91) configured to sense air pressure of the air tank (62), and output sensed air pressure; and
    a vehicle controller (90) configured to control the first relay (81) to be turned on or turned off, according to the sensed air pressure received from the first sensor (91); and
    wherein the first clutch (84) is coupled to the air pump (66), and is coupled to the vehicle controller (90) through the first relay (81), the first clutch (84) is configured to engage or disengage power from the electric motor (10) to the air pump (66), according to a turned on state or a turned off state of the first relay (81).

13. The electric vehicle (1000) of claim 12, wherein when the vehicle controller (90) determines that the sensed air pressure received from the first sensor (91) is less than a first reference value, the vehicle controller (90) controls the first relay (81) to be turned on, the first clutch (84) engages power from the electric motor (10) to the air pump (66), the air pump (66) is driven to work by the electric motor (10) through the transmission device (80), the air pump (66) inflates the air tank (62), and the air pressure of the air tank (62) is increased; when the vehicle controller (90) determines that the sensed air pressure received from the first sensor (91) is greater than a second reference value, the vehicle controller (90) controls the first relay (81) to be turned off, the first clutch (84) disengages power from the electric motor (10) to the air pump (66), and the air pump (66) stop working; and wherein the second reference value is greater than the first reference value.

14. The electric vehicle (1000) of claim 11, wherein the transmission device (80) comprises a second relay (82) and a second clutch (85), and the powertrain system (100) further comprises:
  a second sensor (92) configured to sense a turned on state or a turned off state of the air conditioning (20), and output sensed turned on state or turned off state of the air conditioning (20); and
  a vehicle controller (90) configured to control the second relay (82) to be turned on or turned off, according to the sensed turned on state or turned off state of the air conditioning (20) received from the second sensor (92); and
  wherein the second clutch (85) is coupled to the compressor (26), and is coupled to the vehicle controller (90) through the second relay (82), the second clutch (85) is configured to engage or disengage power from the electric motor (10) to the compressor (26), according to a turned on state or a turned off state of the second relay (82).

15. The electric vehicle (1000) of claim 14, wherein when the second sensor (92) senses that the air conditioning (20) is in the turned on state, and outputs the turned on state of the air conditioning (20) to the vehicle controller (90), the vehicle controller (90) controls the second relay (82) to be turned on, the second clutch (85) engages power from the electric motor (10) to the compressor (26), and the compressor (26) is driven to work by the electric motor (10) through the transmission device (80); when the second sensor (92) senses that the air conditioning (20) is in the turned off state, and outputs the turned off state of the air conditioning (20) to the vehicle controller (90), the vehicle controller (90) controls the second relay (82) to be turned off, the second clutch (85) disengages power from the electric motor (10) to the compressor (26), and the compressor (26) stop working.

16. The electric vehicle (1000) of claim 11, wherein the transmission device (80) comprises a third relay (83) and a third clutch (86), and the powertrain system (100) further comprises:
  a third sensor (93) configured to sense water temperature of the water cooling module (30), and output sensed water temperature; and
  a vehicle controller (90) configured to control the third relay (83) to be turned on or turned off, according to the sensed water temperature received from the third sensor (93); and
  wherein the third clutch (86) is coupled to the electronic fan (40), and is coupled to the vehicle controller (90) through the third relay (83), the third clutch (86) is configured to engage or disengage power from the electric motor (10) to the electronic fan (40), according to a turned on state or a turned off state of the second relay (82).

17. The electric vehicle (1000) of claim 16, wherein when the vehicle controller (90) determines that the sensed water temperature received from the third sensor (93) is greater than a third reference value, the vehicle controller (90) controls the third relay (83) to be turned on, the third clutch (86) engages power from the electric motor (10) to the electronic fan (40), and the electronic fan (40) is driven to work by the electric motor (10) through the transmission device (80); when the vehicle controller (90) determines that the sensed water temperature received from the third sensor (93) is less than or equal to the third reference value, the vehicle controller (90) controls the third relay (83) to be turned off, the third clutch (86) disengages power from the electric motor (10) to the electronic fan (40), and the electronic fan (40) stop working.

18. The electric vehicle (1000) of claim 11, wherein a rotation axis of the electronic fan (40) is located on the same line as a main shaft of the electric motor (10); the air pump (66), the compressor (26), the water pump (36), and the steering pump (50) are positioned on the same side of the electric motor (10).

19. The electric vehicle (1000) of claim 11, wherein the transmission device (80) comprises belts (88) and gears (89).

20. The electric vehicle (1000) of claim 11, wherein start modes of the electric vehicle (1000) comprises a normal start mode and an energy-saving start mode; in the normal start mode, the electric motor (10) starts at a default idle rotational speed; in the energy-saving start mode, the electric motor (10) starts at a zero rotational speed.

* * * * *